H. A. RHOADS.
TROLLEY SHOE.
APPLICATION FILED APR. 1, 1922.

1,430,188.   Patented Sept. 26, 1922.

H. A. Rhoads
INVENTOR

BY  C. P. Harpman
ATTORNEY

Patented Sept. 26, 1922.

1,430,183

UNITED STATES PATENT OFFICE.

HARRY A. RHOADS, OF LEETONIA, OHIO.

TROLLEY SHOE.

Application filed April 1, 1922. Serial No. 548,801.

*To all whom it may concern:*

Be it known that HARRY A. RHOADS, citizen of the United States of America, residing at Leetonia, in the county of Columbiana and State of Ohio, has invented certain new and useful Improvements in Trolley Shoes, of which the following is a specification.

This invention relates to trolley shoes, and is an improved sliding shoe for electrical transmission from trolley wire to a vehicle or a car, and the object of my invention is to improve and perfect such trolley shoes.

The advantages of a sliding shoe, as distinguished over a rotating wheel, are numerous and well known, employing a conducting member with a relatively long contacting surface, which gives more efficient conductivity. However, the use of sliding shoes in practice has been restricted because of certain practical difficulties, such as keeping the shoe in proper contact with the wire, and especially in getting the shoe to automatically reverse with certainty.

The principal object of my invention is to provide a trolley shoe substantially elliptical in side elevation, having an outer groove.

A still further object is to provide a trolley shoe having four wearing surfaces, such wearing surfaces as will come from a forward movement of the shoe when the car or vehicle is advancing. Each of the four wearing surfaces is slightly arched so as to eliminate any sharp angles when the groove has worn down considerably by its sliding movement upon an electrically charged wire.

While I have shown the preferred embodiment of my invention in the accompanying drawing, I do not wish to restrict myself to minor details of construction, which may come within the scope of the specification and appended claims.

Figure 1:
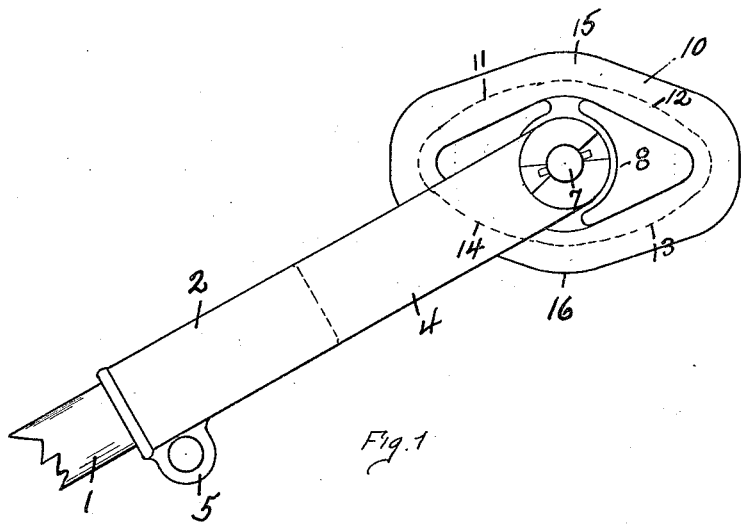
Figure 1 is a side elevation of the trolley shoe positioned within a harp, said harp being mounted upon an end of trolley pole.
Figure 2:
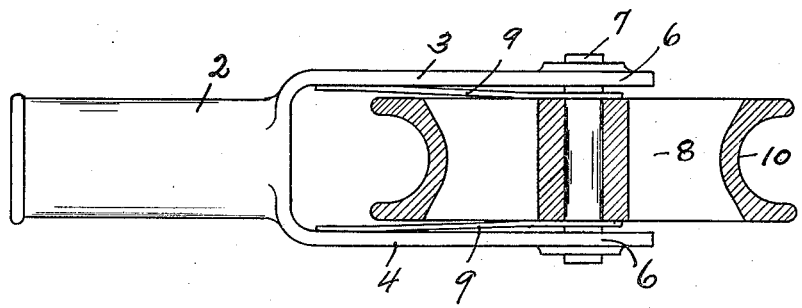
Figure 2 is a top plan view of the device showing the trolley shoe in section.

As shown in the drawing, I have indicated the upper portion of the trolley pole at 1, which is of any ordinary construction and secured to the car or vehicle in an ordinary way. Positioned upon the upper end of the trolley pole 1 is a trolley harp 2, said harp 2 having the upwardly extending arms 3 and 4, and the loop 5 to which the trolley cord is attached, the end portions of the arms 3 and 4 carrying a hub portion 6 to receive an axle 7 on which the trolley shoe 8 is pivotally mounted. I prefer to also provide flat springs 9 attached to the inner surfaces of the arms 3 and 4, the outer ends of which are perforated, and through which passes the axle 7.

By referring to Figure 1 it will be seen that I have provided an outer groove 10 which forms the slidable contact surface when the shoe is in operation. It will be seen that the outer groove 10 is provided with four slightly arched surfaces at points 11, 12, 13 and 14. These slightly arched portions being formed at the centers of the line forming the inner path of the outer groove 10 at points equally distant from the ends and the centers of the sides of said shoe.

One of the objections to sliding trolley shoes has been that when the shoe becomes worn, the groove tends to form an angle which becomes sharper as the groove extends into the shoe, thereby causing an unreliable condition of the shoe in regard to reversing when this direction is taken by the vehicle carrying the shoe.

By referring to Figure 1 it will be seen that the slightly arched surfaces at points 11, 12, 13 and 14 meet at the sides of the oval at points 15 and 16. At these points 15 and 16 the slightly arched surfaces above referred to meet at an obtuse angle, or a semi-angle. It will be seen that even if the outer groove 10 wears down until the wire comes in contact with the points 15 and 16, the difficulty of reversing will be overcome because the tilting from one surface to another surface simply causes the shoe to tilt slightly in order to change positions.

What I claim is:

1. In a device of the class described, comprising four wire engaging surfaces, said surfaces forming an outer groove, said wire engaging surfaces practically forming a substantially elliptical shaped perimeter, substantially as described for the purpose set forth.

2. In a device of the class described, a substantially elliptical shaped trolley shoe, said shoe pivotally mounted on a trolley harp, the pivot point being centrally located between the extreme ends of said shoe and between the extreme outer side portions of said shoe, four slightly arched contact surfaces formed within an outer groove formed in said trolley shoe, substantially as described for the purpose set forth.

In testimony whereof I affix my signature.

HARRY A. RHOADS.

Witnesses:
C. A. HARPMAN,
E. C. GLASNER.